(12) United States Patent
Cai et al.

(10) Patent No.: US 12,509,115 B1
(45) Date of Patent: Dec. 30, 2025

(54) CO-DMPC-BASED CHASSIS MULTI-AGENT SYSTEM (MAS) COOPERATIVE CONTROL METHOD FOR AUTONOMOUS VEHICLES, CONTROLLER, AND STORAGE MEDIUM

(71) Applicant: JIANGSU UNIVERSITY, Jiangsu (CN)

(72) Inventors: Yingfeng Cai, Jiangsu (CN); Yuxing Li, Jiangsu (CN); Yubo Lian, Jiangsu (CN); Zhaozhi Dong, Jiangsu (CN); Xiaoqiang Sun, Jiangsu (CN); Long Chen, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 0 days.

(21) Appl. No.: 19/113,503

(22) PCT Filed: Jul. 2, 2024

(86) PCT No.: PCT/CN2024/103051
§ 371 (c)(1),
(2) Date: Mar. 20, 2025

(30) Foreign Application Priority Data

Jun. 27, 2024 (CN) .......................... 202410846940.6

(51) Int. Cl.
*B60W 60/00* (2020.01)
*B60W 50/00* (2006.01)

(52) U.S. Cl.
CPC ...... *B60W 60/001* (2020.02); *B60W 50/0097* (2013.01); *B60W 2050/0011* (2013.01); *B60W 2050/0034* (2013.01); *B60W 2520/14* (2013.01)

(58) Field of Classification Search
CPC ........... B60W 60/001; B60W 50/0097; B60W 2050/0011; B60W 2050/0034; B60W 2520/14
See application file for complete search history.

(56) References Cited

U.S. PATENT DOCUMENTS

| 10,407,035 B1 * | 9/2019 | Gadda ................... B60W 10/20 |
| 2009/0171526 A1 * | 7/2009 | Takenaka ............ B60W 40/101 701/70 |

(Continued)

FOREIGN PATENT DOCUMENTS

| CN | 109733205 A | * 5/2019 |
| CN | 115016272 A | 9/2022 |

(Continued)

OTHER PUBLICATIONS

CN-109733205-A translation (Year: 2019).*
Cooperative_Control_of_Coupled_Multiage (Year: 2025).*
Distributed_Cooperative_Control_of_Auto (Year: 2025).*

*Primary Examiner* — Kyle T Johnson
(74) *Attorney, Agent, or Firm* — Cooper Legal Group, LLC (57) ABSTRACT

The present disclosure provides a cooperative distributed model predictive control (Co-DMPC)-based chassis multi-agent system (MAS) cooperative control method for autonomous vehicles, a controller, and a storage medium. A distributed state-space equation with state coupling and control input coupling characteristics is established. Meanings and transformation methods of predicted trajectories, assumed trajectories, and optimal trajectories of the states and control inputs are designed, providing a communication basis for information exchange between the agents. In order to coordinate the global performance indexes of a vehicle, a local agent optimization problem considering cost coupling is established, and the influence of the cooperative relationship on the control effect is quantitatively analyzed through adaptive weight coefficients. A method of performing a plurality of iterations within a unit sampling time is adopted, and iteration errors are utilized to enable the controller to achieve a balance between solution accuracy and efficiency.

10 Claims, 2 Drawing Sheets

(56) References Cited

U.S. PATENT DOCUMENTS

2020/0103514 A1    4/2020  Chun et al.
2025/0115134 A1*  4/2025  Chen ........................ B60L 15/20

FOREIGN PATENT DOCUMENTS

| CN | 116954083 A | 10/2023 | | |
|---|---|---|---|---|
| CN | 117584986 A | 2/2024 | | |
| CN | 117774941 A | 3/2024 | | |
| CN | 118859705 A | 10/2024 | | |
| GB | 2290633 A | * | 1/1996 | ......... B60K 23/0808 |

* cited by examiner

CO-DMPC-BASED CHASSIS MULTI-AGENT SYSTEM (MAS) COOPERATIVE CONTROL METHOD FOR AUTONOMOUS VEHICLES, CONTROLLER, AND STORAGE MEDIUM

TECHNICAL FIELD

The present disclosure relates to the field of distributed chassis control for autonomous vehicles, and in particular, to a distributed chassis control architecture design and control algorithm research based on multi-agent theories.

BACKGROUND

With the development of vehicle intelligence, electrification, and wire-control technologies, higher requirements are raised on the comfort, safety, and functionality of chassis systems. More and more active/passive safety technologies such as active front steering (AFS), active rear steering (ARS), and direct yaw moment control (DYC) have been applied. The development of more safety features will inevitably lead to conflicts between different control objectives, such as the impact of DYC on longitudinal velocity and the coordination of ARS and front-wheel steering direction. Currently, researchers mainly use centralized control methods and decentralized control methods to coordinate performance of different systems.

For the centralized control methods, the output of the entire system will eventually be fed back to a central controller and the optimal control input of the entire system can be obtained. Although such methods are relatively mature and can coordinate complex coupling problems among a plurality of subsystems, they will inevitably lead to an increase in the difficulty of solving problems, the computational burden, and the cost of high-computing power controllers as chassis functions become more complex. Moreover, the centralized methods have poor scalability. When the controller fails, the entire system will not work properly. Different from the centralized control methods, the entire system is divided into several subsystems each having a separate controller in the decentralized control methods. Although there is a coupling relationship between the subsystems, the controllers are independent of each other and have no information exchange. The complexity and computational burden of the system are reduced by ignoring the interaction between the controllers. In addition, the decentralized methods will not cause breakdown of the entire system when a single controller fails and still retain a certain degree of controllability. Therefore, such methods have good scalability and strong risk resistance capacity, but lack the means to process coupling state information under strong coupling conditions.

As a powerful tool for processing large and complex systems, distributed control methods have developed rapidly in the fields of power grids, drone formations, and so on in recent years. Compared with the centralized and decentralized methods, the distributed methods allow communication and information sharing between controllers, so that problems such as coupling and coordination between subsystems can be fully considered to achieve global optimization. In addition, the distributed methods have strong scalability, high reliability, and other advantages to meet the control requirements of a plurality of agents and are powerful means to solve coupled cooperative control problems.

Therefore, in response to the above-mentioned contradictions and deficiencies, the present disclosure proposes a cooperative distributed model predictive control (Co-DMPC) architecture based on a multi-agent system (MAS), which iteratively solves a predicted state trajectory and a predicted control trajectory of each agent and exchanges predicted information between the agents, thereby improving the control accuracy of the controllers and reducing the computing time of the controllers.

SUMMARY

In order to solve the above technical problems, the present disclosure provides an MAS-based vehicle chassis cooperative control method, a controller, and a storage device for autonomous vehicles with four-wheel driving and four-wheel steering, which achieves vehicle operation stability in complex conditions and solves the deficiencies in the prior art.

Figure 1:
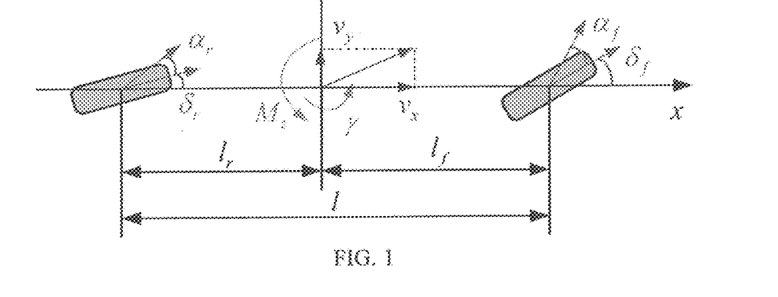
FIG. 1 is a diagram of a two-degree-of-freedom vehicle model with rear-wheel steering and direct yaw moment.

S1: A two-degree-of-freedom vehicle model with four-wheel steering+DYC is built. The role of a suspension is ignored in the modeling process. This model assumes that the vehicle body only moves in a plane parallel to the ground, the steering angles of the left and right wheels on an axle are the same, and the longitudinal velocity of the vehicle is constant. The model is shown in FIG. 1. The simplified model is expressed as follows:

$$\begin{cases} \dot{v}_y = -v_x\gamma - \frac{C_{\alpha f}}{m_s}\left(\frac{v_y + l_f\gamma}{v_x} - \delta_f\right) - \frac{C_{\alpha r}}{m_s}\left(\frac{v_y - l_r\gamma}{v_x} - \delta_r\right) \\ \dot{\gamma} = -\frac{l_f C_{\alpha f}}{I_z}\left(\frac{v_y + l_f\gamma}{v_x} - \delta_f\right) + \frac{l_r C_{\alpha r}}{I_z}\left(\frac{v_y - l_r\gamma}{v_x} - \delta_r\right) + \frac{M_z}{I_z} \end{cases} \quad (1)$$

where $v_x$ is a longitudinal velocity, $v_y$ is a lateral velocity, $\gamma$ is a yaw rate, $m_s$ is vehicle mass, $C_{\alpha f}$ and $C_{\alpha r}$ are front and rear wheel cornering stiffnesses respectively, $l_f$ and $l_r$ are distances from front and rear wheel centers to a center of mass respectively, $\delta_f$ and $\delta_r$ are front and rear wheel steering angles respectively, $I_z$ is a moment of inertia of the vehicle rotating around a z axis, and $M_z$ is a direct yaw moment.

The two-degree-of-freedom vehicle model is combined with a path tracking model to obtain following dynamic equations under the centralized control strategy:

$$\begin{cases} \dot{v}_y = -\frac{C_{\alpha f} + C_{\alpha r}}{m_s v_x}v_y + \left(\frac{C_{\alpha r}l_r - C_{\alpha f}l_f}{m_s v_x} - v_x\right)\gamma + \frac{C_{\alpha f}}{m_s}\delta_f + \frac{C_{\alpha r}}{m_s}\delta_r \\ \dot{\gamma} = \frac{C_{\alpha r}l_r - C_{\alpha f}l_f}{I_z v_x}v_y - \frac{C_{\alpha f}l_f^2 + C_{\alpha r}l_r^2}{I_z v_x}\gamma + \frac{l_f C_{\alpha f}}{I_z}\delta_f - \frac{l_r C_{\alpha r}}{I_z}\delta_r + \frac{M_z}{I_z} \\ \dot{Y} = v_y\cos\varphi + (v_x\cos\varphi - v_y\sin\varphi)\varphi \\ \dot{\varphi} = \gamma \end{cases} \quad (2)$$

where Y is a lateral displacement of the vehicle and $\varphi$ is a yaw angle.

S2: A distributed state-space equation is established. A centralized state-space equation of the vehicle is divided into two agents, namely, a steering agent and a DYC agent according to different control variables. As for the steering agent, the control variables are $\delta_f$ and $\delta_r$, and the state variables are $v_y$ and Y. Its state-space equation is:

$$\dot{x}_1(t) = A_{11}x_1(t) + B_{11}u_1(t) + A_{12}x_2(t) + B_{12}u_2(t) \quad (3)$$

where $$x_1 = \begin{bmatrix} v_y \\ Y \end{bmatrix}, \quad (4)$$

-continued $$A_{11} = \begin{bmatrix} -\frac{C_{af}+C_{ar}}{m_s v_x} & 0 \\ \cos\varphi & 0 \end{bmatrix},$$

$$u_1 = \begin{bmatrix} \delta_f \\ \delta_r \end{bmatrix},$$

$$B_{11} = \begin{bmatrix} \frac{C_{af}}{m_s} & \frac{C_{ar}}{m_s} \\ 0 & 0 \end{bmatrix}$$

$$x_2 = \begin{bmatrix} \gamma \\ \varphi \end{bmatrix},$$

$$A_{12} = \begin{bmatrix} \frac{C_{ar}l_r - C_{af}l_f}{m_s v_x 0} - v_x & 0 \\ 0 & v_x\cos\varphi - v_y\sin\varphi \end{bmatrix},$$

$$u_2 = M_z, B_{12} = \begin{bmatrix} 0 \\ 0 \end{bmatrix}$$

As for the DYC agent, the control variable is $M_z$ and the tracked state variables are $\gamma$ and $\varphi$. Its state-space equation is:

$$\dot{x}_2(t) = A_{22}x_2(t) + B_{22}u_2(t) + A_{21}x_1(t) + B_{21}u_1(t) \quad (5)$$

where $$A_{22} = \begin{bmatrix} -\frac{C_{af}l_f^2 + C_{ar}l_r^2}{I_z v_x} & 0 \\ 1 & 0 \end{bmatrix}, \quad (6)$$

$$B_{22} = \begin{bmatrix} \frac{1}{I_z} \\ 0 \end{bmatrix},$$

$$A_{21} = \begin{bmatrix} \frac{C_{ar}l_r - C_{af}l_f}{I_z v_x} & 0 \\ 0 & 0 \end{bmatrix},$$

$$B_{21} = \begin{bmatrix} \frac{l_f C_{af}}{I_z} & -\frac{l_r C_{ar}}{I_z} \\ 0 & 0 \end{bmatrix}$$

Figure 2:
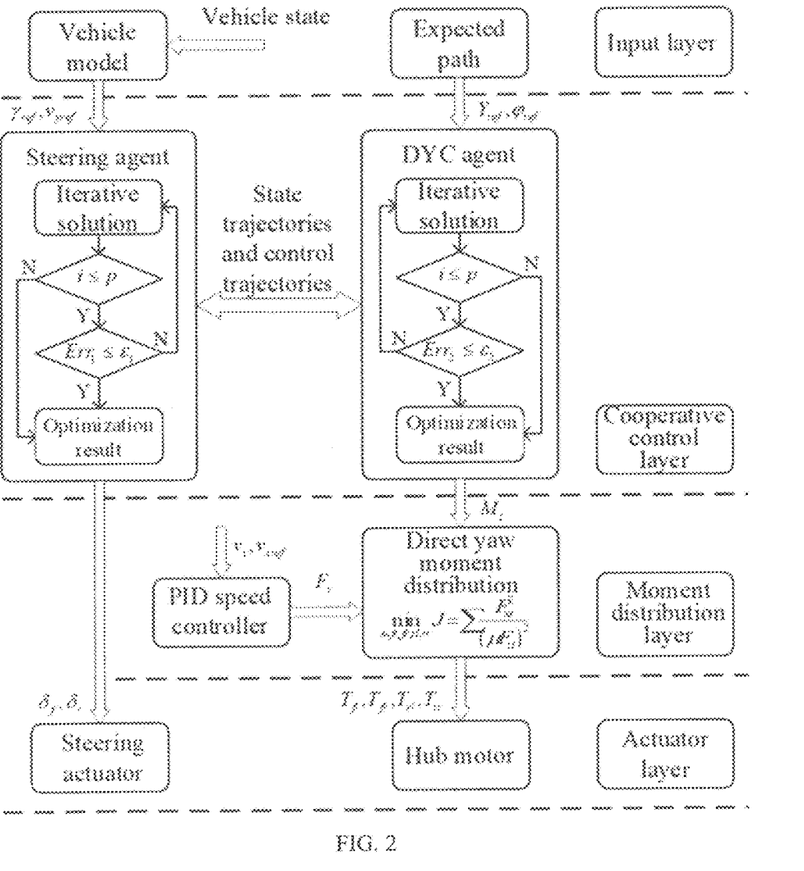
FIG. 2 is a diagram of an MAS control architecture.

S3: A cooperative control framework as shown in FIG. 2 is built. In an input layer, the vehicle model computes a reference yaw rate $\gamma_{ref}$ and a reference lateral velocity $v_{yref}$ according to the deviation between a current state of the vehicle and a target path. In a cooperative control layer, a conventional centralized chassis control method is decomposed into a distributed control system consisting of a plurality of controllers, to achieve tracking of expected targets. Through the coupled state-space equation established in the S2, a Co-DMPC algorithm is employed to select a cost function considering global performance. An iterative update method is used in a unit sampling time, enabling agents to independently compute its own local optimization problem and exchange computation results multiple times. By reasonably setting iteration termination conditions, the entire system can eventually obtain a global optimal solution. In a moment distribution layer, driving/braking torques of the four wheels are optimally distributed based on a total driving force computed by a proportional-integral-derivative (PID) speed controller and a direct yaw moment computed by the cooperative control layer as constraints. The control variables are applied to the four wheels through a steering actuator and a hub motor to achieve accurate control of the vehicle.

S4: An information transmission protocol is established. A same prediction time domain $N_p$ and a same control time domain $N_c$ are used in all the agents. As for an agent i, in a control time domain $[t, t+N_c]$, a control variable at a time point t+k is predicted at a time point t as $u_i(k|t)$. Following three sets of control trajectories are defined:

(1) $u_i^p(k|t)$: predicted control trajectory;
(2) $u_i^*(k|t)$: optimal control trajectory;
(3) $u_i^a(k|t)$: assumed control trajectory.

$u_i^p(k|t)$ represents a control variable at a future time point predicted by the controller based on the current state and a control variable at a previous time point. $u_i^*(k|t)$ represents an optimal solution obtained by the controller after solving the local optimization problems. $u_i^a(k|t)$ represents an assumed control variable transmitted by the agent i to a neighbor agent and is obtained by shifting a predicted control variable by one sampling period.

In a prediction time domain $[t, t+N_p]$, a state variable at the time point t+k is predicted at the time point t as $x_i(k|t)$. Following three sets of state trajectories are defined and their meanings are similar to those of the control trajectories:

(1) $x_i^p(k|t)$: predicted state trajectory;
(2) $x_i^*(k|t)$: optimal state trajectory;
(3) $x_i^a(k|t)$: assumed state trajectory.

Figure 3:
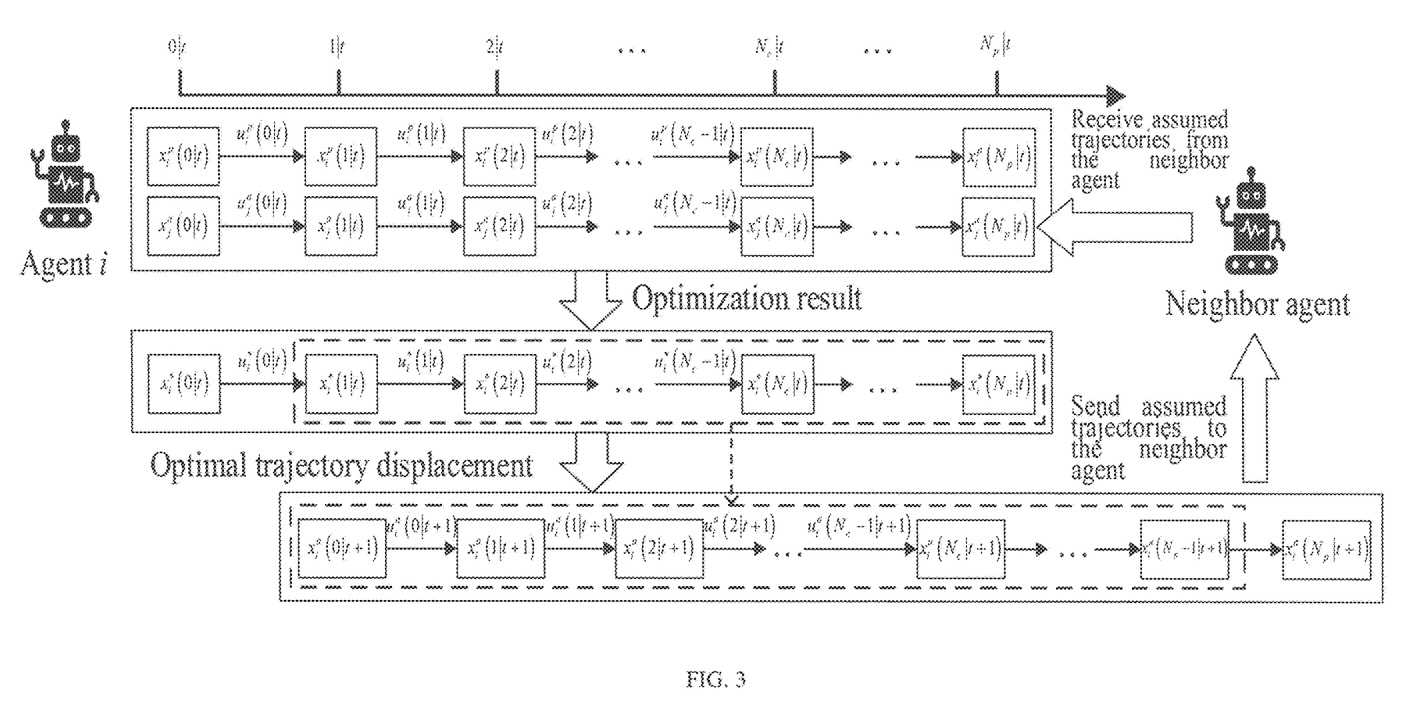
FIG. 3 is a diagram of an information exchange and transformation architecture.

The relationships between the predicted trajectories, the optimal trajectories, and the assumed trajectories are shown in FIG. 3.

The agent i uses, at the time point t, a predicted state $x_i^p(k|t)$ at the future time point and an assumed state $x_j^a(k|t)$ and an assumed control $u_j^a(k|t)$ from the neighbor agent to solve a distributed optimization problem. When k=0, $x_i^p(0|t)=x_i(t)$ and $x_j^p(0|t)=x_j(t)$, where $x_i(t)$ and $x_j(t)$ are directly measured current states of the vehicle. After obtaining an optimal state $x_i^*(k|t)$ and an optimal control $u_i^*(k|t)$, a first $u_i^*(0|t)$ of a control trajectory is applied to actual control. A single-step recursion is performed on the optimal state trajectory and the optimal control trajectory to obtain assumed trajectories. That is:

$$u_i^a(k-1|t+1) = u_i^*(k|t), k \in [1, N_c-1]$$

$$x_i^a(k-1|t+1) = x_i^*(k|t), k \in [1, N_p] \quad (7)$$

It should be noted that a length of the control trajectory is $N_c-1$ and to complete a last term, $u_i^a(N_c-1|t+1)=0$. A state of the vehicle not under control at a next time point is $x_i^a(N_p|t+1) = Ax_i^a(N_p-1|t+1) = Ax_i^*(N_p|t)$.

S5: A local agent state equation is derived. According to characteristics of MAS state coupling, a local continuous linear state equation is expressed as:

$$\dot{x}_i(t) = A_{ii}x_i(t) + B_{ii}u_i(t) + \sum_{j=1, j\neq i}^{m}(A_{ij}x_j(t) + B_{ij}u_j(t)) \quad (8)$$

where m is the number of the agents. The above formula is discretized into:

$$x_i(k+1|t) = \tilde{A}_{ii}x_i(k|t) + \tilde{B}_{ii}u_i(k|t) + \sum_{j=1, j\neq i}^{m}(\tilde{A}_{ij}x_j(k|t) + \tilde{B}_{ij}u_j(k|t)) \quad (9)$$

where $$\tilde{A}_{ii} = I + TA_{ii}, \ \tilde{B}_{ii} = TB_{ii}, \ \tilde{A}_{ij} = TA_{ij}, \ \tilde{B}_{ij} = TB_{ij} \quad (10)$$

$x_i^p$ in a time domain $[1, N_p]$ is obtained by recursion as follows:

$$x_i^p(1|t) = A_{ii}x_i(t) + B_{ii}u_i^p(0|t) + \sum_{j=1,j\neq i}^{m} \left(A_{ij}x_j(t) + B_{ij}u_j^a(0|t)\right)$$

$$x_i^p(2|t) = A_{ii}x_i^p(1|t) + B_{ii}u_i^p(1|t) + \sum_{j=1,j\neq i}^{m} \left(A_{ij}x_j^a(1|t) + B_{ij}u_j^a(1|t)\right)$$

$$= A_{ii}^2 x_i(t) + A_{ii}B_{ii}u_i^p(0|t) + \sum_{j=1,j\neq i}^{m} A_{ii}\left(A_{ij}x_j(t) + B_{ij}u_j^a(0|t)\right)$$

$$+ B_{ii}u_i^p(1|t) + \sum_{j=1,j\neq i}^{m} \left(A_{ij}x_j^a(1|t) + B_{ij}u_j^a(1|t)\right)$$

$$\vdots$$

$$x_i^p(N_p|t) = A_{ii}^{N_p} x_i(t) + A_{ii}^{N_p-1}B_{ii}u_i^p(0|t) + \sum_{j=1,j\neq i}^{m} A_{ii}^{N_p-1}\left(A_{ij}x_j(t) + B_{ij}u_j^a(0|t)\right)$$

$$+ A_{ii}^{N_p-2}B_{ii}u_i^p(1|t) + \sum_{j=1,j\neq i}^{m} A_{ii}^{N_p-2}\left(A_{ij}x_j^a(1|t) + B_{ij}u_j^a(1|t)\right)$$

$$\vdots$$

$$+ A_{ii}^{N_p-N_c}B_{ii}u_i^p(N_c-1|t) + \sum_{j=1,j\neq i}^{m} A_{ii}^{N_p-N_c}\left(A_{ij}x_j^a(N_c-1|t) + B_{ij}u_j^a(N_c-1|t)\right)$$

$$+ \sum_{j=1,j\neq i}^{m} A_{ii}^{N_p-N_c-1}A_{ij}x_j^a(N_c|t) + \cdots + \sum_{j=1,j\neq i}^{m} A_{ii}A_{ij}x_j^a(N_p-2|t) + \sum_{j=1,j\neq i}^{m} A_{ij}x_j^a(N_p-1|t) \quad (11)$$

The above recursion is expressed in a following augmented matrix:

$$X_i = F_{ii}x_i(t) + G_{ii}U_i + \sum_{j=1,j\neq i}^{m} (F_{ij}X_j + G_{ij}U_j) \text{ where} \quad (12)$$

$$X_i = \begin{bmatrix} x_i^p(1|t) \\ x_i^p(2|t) \\ x_i^p(3|t) \\ \vdots \\ x_i^p(N_p|t) \end{bmatrix}, \quad (13)$$

$$U_i = \begin{bmatrix} u_i^p(0|t) \\ u_i^p(1|t) \\ u_i^p(2|t) \\ \vdots \\ u_i^p(N_c-1|t) \end{bmatrix},$$

$$X_j = \begin{bmatrix} x_j(t) \\ x_j^a(1|t) \\ x_j^a(2|t) \\ \vdots \\ x_j^a(N_p-1|t) \end{bmatrix},$$

$$U_j = \begin{bmatrix} u_j^a(0|t) \\ u_j^a(1|t) \\ u_j^a(2|t) \\ \vdots \\ u_j^a(N_c-1|t) \end{bmatrix},$$

$$F_{ii} = \begin{bmatrix} \tilde{A}_{ii} \\ \tilde{A}_{ii}^2 \\ \tilde{A}_{ii}^3 \\ \vdots \\ \tilde{A}_{ii}^{N_p} \end{bmatrix}, \quad (14)$$

-continued $$G_{ii} = \begin{bmatrix} \tilde{B}_{ii} & 0 & 0 & \cdots & 0 \\ \tilde{A}_{ii}\tilde{B}_{ii} & \tilde{B}_{ii} & 0 & \cdots & 0 \\ \tilde{A}_{ii}^2\tilde{B}_{ii} & \tilde{A}_{ii}\tilde{B}_{ii} & \tilde{B}_{ii} & \cdots & 0 \\ \vdots & \vdots & \vdots & \ddots & \vdots \\ \tilde{A}_{ii}^{N_p-1}\tilde{B}_{ii} & \tilde{A}_{ii}^{N_p-2}\tilde{B}_{ii} & \tilde{A}_{ii}^{N_p-3}\tilde{B}_{ii} & \cdots & \tilde{A}_{ii}^{N_p-N_c}\tilde{B}_{ii} \end{bmatrix}$$

$$F_{ij} = \begin{bmatrix} \tilde{A}_{ij} & 0 & 0 & \cdots & 0 \\ \tilde{A}_{ii}\tilde{A}_{ij} & \tilde{A}_{ij} & 0 & \cdots & 0 \\ \tilde{A}_{ii}^2\tilde{A}_{ij} & \tilde{A}_{ii}\tilde{A}_{ij} & \tilde{A}_{ij} & \cdots & 0 \\ \vdots & \vdots & \vdots & \ddots & \vdots \\ \tilde{A}_{ii}^{N_p-1}\tilde{A}_{ij} & \tilde{A}_{ii}^{N_p-2}\tilde{A}_{ij} & \tilde{A}_{ii}^{N_p-3}\tilde{A}_{ij} & \cdots & \tilde{A}_{ij} \end{bmatrix}, \quad (15)$$

$$G_{ij} = \begin{bmatrix} \tilde{B}_{ij} & 0 & 0 & \cdots & 0 \\ \tilde{A}_{ii}\tilde{B}_{ij} & \tilde{B}_{ij} & 0 & \cdots & 0 \\ \tilde{A}_{ii}^2\tilde{B}_{ij} & \tilde{A}_{ii}\tilde{B}_{ij} & \tilde{B}_{ij} & \cdots & 0 \\ \vdots & \vdots & \vdots & \ddots & \vdots \\ \tilde{A}_{ii}^{N_p-1}\tilde{B}_{ij} & \tilde{A}_{ii}^{N_p-2}\tilde{B}_{ij} & \tilde{A}_{ii}^{N_p-3}\tilde{B}_{ij} & \cdots & \tilde{A}_{ii}^{N_p-N_c}\tilde{B}_{ij} \end{bmatrix}$$

S6: The local optimization problem is solved. The Co-DMPC algorithm is proposed to solve the problem of parallel computing between subsystems with strong coupling characteristics, and is also suitable for coordination and cooperation between sub-agents in the MAS. By exchanging state information and control sequences, the global optimization can be achieved. The system becomes highly scalable, the "plug and play" function of the vehicle chassis system can be realized, and the cost of matching software and hardware between vehicle models with different functions is reduced.

Without considering global performance indexes, that is, in the case of non-cooperative distribution, the local optimization problem for the agent i is designed as follows:

$$\min_{U_i(t)} J_{i(i)}\left(x_i^p, u_i^p, x_j^a, u_j^a\right) = \sum_{k=1}^{N_p} \|x_i(k\mid t) - w_i(t+k)\|_{Q_i}^2 + \sum_{k=1}^{N_c} \|u_i(k-1\mid t)\|_{R_i}^2 \qquad (16)$$

$$= \|X_i - W_i\|_{\tilde{Q}_i}^2 + \|U_i\|_{\tilde{R}_i}^2$$

The equation is subject to the following constraints:

$$x_i^p(k+1\mid t) = \tilde{A}_{ii} x_i^p(k\mid t) + \tilde{B}_{ii} x_i^p(k\mid t) + \sum_{j=1,j\neq i}^{m} \left(\tilde{A}_{ij} x_j^a(k\mid t) + \tilde{B}_{ij} u_j^a(k\mid t)\right) \qquad (17)$$

$$x_i^p(0\mid t) = x_i(t) \qquad (18)$$

$$x_j^p(0\mid t) = x_j(t) \qquad (19)$$

$$u_i^p(k\mid t) \in U_{ij} \qquad (20)$$

where $w_i(t+k)$ is a reference state value of the agent i, and $W_i$ is a reference state sequence composed of $w_i(t+k)$. $Q_i$ and $R_i$ are a state weight coefficient and a control weight coefficient respectively, and $\tilde{Q}_i = \text{diag}(Q_i, Q_i, \ldots, Q_i)_{N_p \times N_p}$, $\tilde{R}_i = \text{diag}(R_i, R_i, \ldots, R_i)_{N_c \times N_c}$. Specifically, $Q_i$ is penalty for deviation between an actual trajectory and an expected trajectory, reflecting desire of the vehicle to adhere to the expected trajectory; and $R_i$ is penalty for control input, reflecting desire of the vehicle to travel with lower control energy. The constraint (17) is a dynamic constraint for the vehicle. The constraints (18) and (19) require an initial state of the vehicle in the prediction time domain to be equal to an actual state of the vehicle. The constraint (20) is an input constraint for the agents, preventing an optimization result from exceeding a range of actuator motion.

The difference between the Co-DMPC algorithm and the non-cooperative DMPC algorithm mainly lies in whether the global performance indexes are considered. Each agent has strong dependence on the states or control inputs of its neighbor agents, so that the Co-DMPC requires strong communication capabilities. In addition, cost coupling exists between an agent and its neighbor agents applying the Co-DMPC algorithm when describing the optimization problem. Therefore, the optimization problem considering the global performance indexes is expressed as:

$$\min_{U_i(t)} J_i\left(x_i^p, u_i^p, x_j^a, u_j^a\right) = \lambda_i J_{(i)}\left(x_i^p, u_i^p, x_j^a, u_j^a\right) + \sum_{j=1,j\neq i}^{m} \lambda_j J_{(j)}\left(x_j^p, u_j^p, x_i^a, u_i^a\right) \qquad (21)$$

$$= \lambda_i \|X_i - W_i\|_{\tilde{Q}_i}^2 + \lambda_i \|U_i\|_{\tilde{R}_i}^2 +$$

$$\sum_{j=1,j\neq i}^{m} \left[\lambda_j \|X_j - W_j\|_{\tilde{Q}_j}^2 + \lambda_j \|U_j\|_{\tilde{R}_j}^2\right]$$

where $\lambda_i$ is a coupling coefficient of the cost function between different agents, and $$\sum_{i=1}^{m} \lambda_i = 1.$$

The constraints are the same as those in the formulas (17) to (20). In addition, in order to improve computing efficiency of the controller, an optimization problem is transformed into a quadratic programming problem:

$$J_i\left(x_i^p, u_i^p, x_j^a, u_j^a\right) = \qquad (22)$$

$$\lambda_i \left\| F_{ii} x_i(k) + G_{ii} U_i + \sum_{j1, j\neq i}^{m} (F_{ij} X_j + G_{ij} U_j) - W_i \right\|_{Q_i}^2 + \lambda_i \|U_i\|_{R_i}^2 +$$

$$\sum_{j=1,j\neq i}^{m} \lambda_j \left\| F_{jj} x_j(k) + G_{jj} U_j + \sum_{k=1, k\neq j}^{m} (F_{jk} X_k + G_{jk} U_k) - W_j \right\|_{Q}^2 +$$

$$\sum_{j=1,j\neq i}^{m} \lambda_j \|U_j\|_R^2 = U_i^T \mathfrak{J}_i U_i + 2(\mathfrak{R}_i + \aleph_i) U_i + const$$

where const is a constant term not affecting the optimization result, and $$\mathfrak{J}_i = \lambda_i G_{ii}^T Q_i G_{ii} + \lambda_i R_i + \sum_{j=1,j\neq i}^{m} \lambda_j G_{ji}^T Q_i G_{ji} \qquad (23)$$

$$\mathfrak{R}_i = \sum_{j=1}^{m} \lambda_j \left[x_j^T(k) F_{jj}^T - W_j^T\right] Q_j G_{ji}$$

$$\aleph_i = \sum_{j=1}^{m} \lambda_j \left[\sum_{k=1,k\neq i}^{m} U_k^T G_{jk}^T + \sum_{k=1,k\neq j}^{m} X_k^T F_{jk}^T\right] Q_j G_{ji}$$

After completing a single optimization computation, a local agent only obtains a local optimal solution and cannot achieve accurate control of the vehicle. In order to reduce the optimization error, the present disclosure adopts a cyclic iterative update method to exchange multiple times an optimal control sequence and an optimal state sequence after optimization within a single control cycle, thereby achieving the global optimal solution. At the same time, it should be noted that the use of the iterative update method actually increases the computational burden of the controller and the occupancy rate of the communication network. Therefore, setting the iteration termination conditions reasonably is an important factor to ensure the real-time performance of the controller.

The present disclosure designs two termination conditions in response to the above requirements. Firstly, the error between two consecutive iterative optimization results is recorded as $\text{Err}_i = |U_i^n - U_i^{n-1}|$. $U_i^n$ represents the optimization result of the agent i in an $n^{th}$ iteration. When the error $\text{Err}_i$ is less than a threshold $\varepsilon_i$, the controller optimization result converges to the global optimal solution. At this time, iteration is terminated and the next step is carried out. If the controller iteration error fails to converge to $\varepsilon_i$, a maximum number of the iteration $p_{max}$ needs to be set to prevent the controller from performing invalid computation.

S7: The direct yaw moment is distributed. After computing the direct yaw moment of the vehicle, the DYC agent distributes the direct yaw moment of the vehicle reasonably to the four wheels according to the state of the vehicle, thereby avoiding tire force saturation. The distributed torques must also meet requirements of driving the vehicle forward and tracking the target speed. Firstly, a total driving force equation of the vehicle is established according to a PID algorithm:

$$F_x(t) = K_p e(t) + K_i \int_0^t e(\tau)d\tau + K_d \frac{de(t)}{dt} \quad (24)$$

where $e(t)=v_x-v_{ref}$. Next, a following optimization problem is considered:

$$\min_{F_{xij}, i=fl,fr,rl,rr} J = \frac{F_{xfl}^2 + F_{yfl}^2}{(\mu F_{zfl})^2} + \frac{F_{xfr}^2 + F_{yfr}^2}{(\mu F_{zfr})^2} + \frac{F_{xrl}^2 + F_{yrl}^2}{(\mu F_{zrl})^2} + \frac{F_{xrr}^2 + F_{yrr}^2}{(\mu F_{zrr})^2} \quad (25)$$

Since the steering agent has computed the steering angles of the four wheels, the lateral tire force $F_{yij}$, $i=fl, fr, rl, rr$, is a constant and has no effect on solution of the above optimization problem. Therefore, the formula (25) can be expressed as:

$$\min_{F_{xij}, i=fl,fr,rl,rr} J = \frac{F_{xfl}^2}{(\mu F_{zfl})^2} + \frac{F_{xfr}^2}{(\mu F_{zfr})^2} + \frac{F_{xrl}^2}{(\mu F_{zrl})^2} + \frac{F_{xrr}^2}{(\mu F_{zrr})^2} \quad (26)$$

The above formula is subject to the following constraints:

$$\frac{F_{xfl}}{m_s} + \frac{F_{xfr}}{m_s} + \frac{F_{xrl}}{m_s} + \frac{F_{xrr}}{m_s} = F_x \quad (27)$$

$$\frac{d}{2}(F_{xfr} + F_{xrr}) - \frac{d}{2}(F_{xrl} + F_{xrl}) = M_z \quad (28)$$

$$\frac{T_{min}}{R_w} \leq F_{xi} \leq \frac{T_{max}}{R_w}, \, i = fl, fr, rl, rr \quad (29)$$

where the constraint (27) requires the total driving force distributed to the four wheels to meet the requirements of the speed controller, the constraint (28) requires the yaw moment formed by the longitudinal tire force to satisfy the computation result of the DYC agent, and the constraint (29) requires the magnitude of the driving force to be within the range of the actuator motion; $T_{min}$ is a minimum driving torque (that is, braking torque), $T_{max}$ is a maximum driving torque, and $T_{max}=-T_{min}$. The fmincon command is used in MATLAB to solve the formula (26) to obtain the driving/braking torques of the four wheels.

S8: The computation results of the steering agent and the DYC agent are sent to the actuator.

The present disclosure has the following advantages:

1. A distributed state-space equation with state coupling and control input coupling characteristics is established, which reflects the mutual coupling between a plurality of agents, comprehensively considers the influences of the states and control inputs of neighbor agents, and improves the accuracy of local agents in predicting future state sequences.

2. The meanings and transformation methods of the predicted trajectories, assumed trajectories, and optimal trajectories of the states and control inputs are designed, providing a communication basis for information exchange between the agents. In order to coordinate the global performance indexes of the vehicle, a local agent optimization problem considering cost coupling is established, and the influence of the cooperative relationship on the control effect is quantitatively analyzed through adaptive weight coefficients.

3. A method of performing a plurality of iterations within a unit sampling time is adopted, and iteration errors are utilized to enable the controller to achieve a balance between solution accuracy and efficiency.

DETAILED DESCRIPTION OF THE EMBODIMENTS

To facilitate the understanding of persons skilled in the art, the present disclosure is further described below with reference to embodiments and the accompanying drawings. The contents mentioned in the implementation are not intended to limit the present disclosure.

S1: A two-degree-of-freedom vehicle model with four-wheel steering+DYC is built. The role of a suspension is ignored in the modeling process. This model assumes that the vehicle body only moves in a plane parallel to the ground, the steering angles of the left and right wheels on an axle are the same, and the longitudinal velocity of the vehicle is constant. The model is shown in FIG. 1. The simplified model is expressed as follows:

$$\begin{cases} \dot{v}_y = -v_x\gamma - \frac{C_{\alpha f}}{m_s}\left(\frac{v_y + l_f\gamma}{v_x} - \delta_f\right) - \frac{C_{\alpha r}}{m_s}\left(\frac{v_y + l_r\gamma}{v_x} - \delta_r\right) \\ \dot{\gamma} = -\frac{l_f C_{\alpha f}}{I_z}\left(\frac{v_y + l_f\gamma}{v_x} - \delta_f\right) + \frac{l_r C_{\alpha r}}{I_z}\left(\frac{v_y - l_r\gamma}{v_x} - \delta_r\right) + \frac{M_z}{I_z} \end{cases} \quad (30)$$

where $v_x$ is a longitudinal velocity, $v_y$ is a lateral velocity, $\gamma$ is a yaw rate, $m_s$ is vehicle mass, $C_{\alpha f}$ and $C_{\alpha r}$ are front and rear wheel cornering stiffnesses respectively, $l_f$ and $l_r$ are distances from front and rear wheel centers to a center of mass respectively, $\delta_s$ and $\delta_r$ are front and rear wheel steering angles respectively, $I_z$ is a moment of inertia of the vehicle rotating around a z axis, and $M_z$ is a direct yaw moment.

The two-degree-of-freedom vehicle model is combined with a path tracking model to obtain the following dynamic equations under the centralized control strategy:

$$\begin{cases} \dot{v}_y = -\frac{C_{\alpha f} + C_{\alpha r}}{m_s v_x}v_y + \left(\frac{C_{\alpha r}l_r - C_{\alpha f}l_f}{m_s v_x} - v_x\right)\gamma + \frac{C_{\alpha f}}{m_s}\delta_f + \frac{C_{\alpha r}}{m_s}\delta_r \\ \dot{\gamma} = \frac{C_{\alpha r}l_r - C_{\alpha f}l_f}{I_z v_x}v_y - \frac{C_{\alpha f}l_f^2 + C_{\alpha r}l_r^2}{I_z v_x}\gamma + \frac{l_f C_{\alpha f}}{I_z}\delta_f - \frac{l_r C_{\alpha r}}{I_z}\delta_r + \frac{M_z}{I_z} \\ \dot{Y} = v_y\cos\varphi + (v_x\cos\varphi - v_y\sin\varphi)\varphi \\ \dot{\varphi} = \gamma \end{cases} \quad (31)$$

where Y is a lateral displacement of the vehicle and $\varphi$ is a yaw angle.

S2: A distributed state-space equation is established. A centralized state-space equation of the vehicle is divided into two agents, namely, a steering agent and a DYC agent according to different control variables. As for the steering agent, the control variables are $\delta_f$ and $\delta_r$, and the state variables are $v_y$ and Y. Its state-space equation is:

$$\dot{x}_1(t) = A_{11}x_1(t) + B_{11}u_1(t) + A_{12}x_2(t) + B_{12}u_2(t) \quad (32)$$

where $$x_1 = \begin{bmatrix} v_y \\ Y \end{bmatrix}, \quad (33)$$

$$A_{11} = \begin{bmatrix} -\dfrac{C_{af} + C_{ar}}{m_s v_x} & 0 \\ \cos\varphi & 0 \end{bmatrix},$$

$$u_1 = \begin{bmatrix} \delta_f \\ \delta_r \end{bmatrix},$$

$$B_{11} = \begin{bmatrix} \dfrac{C_{af}}{m_s} & \dfrac{C_{ar}}{m_s} \\ 0 & 0 \end{bmatrix}$$

$$x_2 = \begin{bmatrix} \gamma \\ \varphi \end{bmatrix},$$

$$A_{12} = \begin{bmatrix} \dfrac{C_{ar}l_r - C_{af}l_f}{m_s v_x} - v_x & 0 \\ 0 & v_x\cos\varphi - v_y\sin\varphi \end{bmatrix},$$

$$u_2 = M_z, \quad B_{12} = \begin{bmatrix} 0 \\ 0 \end{bmatrix}$$

As for the DYC agent, the control variable is $M_z$ and the tracked state variables are $\gamma$ and $\varphi$. Its state-space equation is:

$$\dot{x}_2(t) = A_{22}x_2(t) + B_{22}u_2(t) + A_{21}x_1(t) + B_{21}u_1(t) \quad (34)$$

where $$A_{22} = \begin{bmatrix} -\dfrac{C_{af}l_f^2 + C_{ar}l_r^2}{I_z v_x} & 0 \\ 1 & 0 \end{bmatrix}, \quad (35)$$

$$B_{22} = \begin{bmatrix} \dfrac{1}{I_z} \\ 0 \end{bmatrix},$$

$$A_{21} = \begin{bmatrix} \dfrac{C_{ar}l_r - C_{af}l_f}{I_z v_x} & 0 \\ 0 & 0 \end{bmatrix},$$

$$B_{21} = \begin{bmatrix} \dfrac{l_f C_{af}}{I_z} & -\dfrac{l_r C_{ar}}{I_z} \\ 0 & 0 \end{bmatrix}$$

S3: A cooperative control framework as shown in FIG. 2 is built. It includes four layers: (1) In an input layer, the vehicle model computes a reference yaw rate $\gamma_{ref}$ and a reference lateral velocity $v_{yref}$ according to the deviation between the current state of the vehicle and a target path. (2) In a cooperative control layer, the conventional centralized chassis control method is decomposed into a distributed control system consisting of a plurality of controllers, to achieve tracking of expected targets. Through the coupled state-space equation established in the S2, a Co-DMPC algorithm is employed to select a cost function considering global performance. An iterative update method is used in a unit sampling time, enabling each agent to independently compute its own optimization problem and exchange computation results multiple times. By reasonably setting the iteration termination conditions, the entire system can eventually obtain the global optimal solution. (3) In a moment distribution layer, the driving/braking torques of the four wheels are optimally distributed based on a total driving force computed by a PID speed controller and a direct yaw moment computed by the upper layer as constraints. (4) In an actuation layer, the control variables are applied to the four wheels through a steering actuator and a hub motor to achieve accurate control of the vehicle.

S4: An information transmission protocol is established. A same prediction time domain $N_p$ and a same control time domain $N_c$ are used in all the agents. As for an agent i, in a control time domain $[t, t+N_c]$, the control variable at a time point t+k is predicted at a time point t as $u_i(k|t)$. The following three sets of control trajectories are defined:

(1) $u_i^p(k|t)$: predicted control trajectory;
(2) $u_i^*(k|t)$: optimal control trajectory;
(3) $u_i^a(k|t)$: assumed control trajectory.

$u_i^p(k|t)$ represents a control variable at a future time point predicted by the controller based on the current state and the control variable at a previous time point. $u_i^*(k|t)$ represents an optimal solution obtained by the controller after solving the local optimization problems. $u_i^a(k|t)$ represents an assumed control variable transmitted by the agent i to the neighbor agent and is obtained by shifting the predicted control variable $u_i^p(k|t)$ by one sampling period T, that is, moving the entire trajectory toward a future time point to make the elements originally at the time point t=0 become elements at the time point t=1.

In a prediction time domain $[t, t+N_p]$, the state variable at a time point t+k is predicted at a time point t as $x_i(k|t)$. The following three sets of state trajectories are defined and their meanings are similar to those of the control trajectories:

(1) $x_i^p(k|t)$: predicted state trajectory;
(2) $x_i^*(k|t)$: optimal state trajectory;
(3) $x_i^a(k|t)$: assumed state trajectory.

The relationships between the predicted trajectories, the optimal trajectories, and the assumed trajectories are shown in FIG. 3.

The agent i uses, at the time point t, the predicted state $x_i^p(k|t)$ at the future time point and the assumed state $x_j^a(k|t)$ and the assumed control $u_j^a(k|t)$ from the neighbor agent j to solve the distributed optimization problem. When k=0, $x_i^p(0|t) = x_i(t)$ and $x_j^p(0|t) = x_j(t)$, where $x_i(t)$ and $x_j(t)$ are directly measured current states of the vehicle. After obtaining the optimal state $x_i^*(k|t)$ and the optimal control $u_i^*(k|t)$, the first $u_i^*(0|t)$ of the control trajectory is applied to actual control. A single-step recursion is performed on the optimal state trajectory and the optimal control trajectory to obtain the assumed trajectories. That is:

$$u_i^a(k-1|t+1) = u_i^*(k|t), \; k \in [1, N_c-1]$$

$$x_i^a(k-1|t+1) = x_i^*(k|t), \; k \in [1, N_p] \quad (36)$$

It should be noted that the length of the control trajectory is $N_c - 1$ and to complete the last term, $u_i^a(N_c-1|t+1) = 0$. The state of the vehicle not under control at a next time point is $x_i^a(N_p|t+1) = A_{ii}x_i^a(N_p-1|t+1) = A_{ii}x_i^*(N_p|t)$, where $A_{ii}$ is a state matrix of the agent i.

S5: A local agent state equation is derived. According to the characteristics of MAS state coupling, a local continuous linear state equation can be expressed as:

$$\dot{x}_i(t) = A_{ii}x_i(t) + B_{ii}u_i(t) + \sum_{j=1, j \neq i}^{m}(A_{ij}x_j(t) + B_{ij}u_j(t)) \quad (37)$$

where m is the number of agents. The above formula is discretized into:

$$x_i(k+1|t) = \tilde{A}_{ii}x_i(k|t) + \tilde{B}_{ii}u_i(k|t) + \sum_{j=1,j\neq i}^{m}\left(\tilde{A}_{ij}x_j(k|t) + \tilde{B}_{ij}u_j(k|t)\right) \quad (38)$$

where $$\tilde{A}_{ii}=I+TA_{ii}, \tilde{B}_{ii}=TB_{ii}, \tilde{A}_{ij}=TA_{ij}, \tilde{B}_{ij}=TB_{ij} \quad (39)$$

$x_i^p$ in the time domain $[1, N_p]$ can be obtained by recursion as follows:

$$\begin{aligned}
x_i^p(1|t) &= A_{ii}x_i(t) + B_{ii}u_i^p(0|t) + \sum_{j=1,j\neq i}^{m}\left(A_{ij}x_j(t) + B_{ij}u_j^a(0|t)\right) \\
x_i^p(2|t) &= A_{ii}x_i^p(1|t) + B_{ii}u_i^p(1|t) + \sum_{j=1,j\neq i}^{m}\left(A_{ij}x_j^a(1|t) + B_{ij}u_j^a(1|t)\right) \\
&= A_{ii}^2 x_i(t) + A_{ii}B_{ii}u_i^p(0|t) + \sum_{j=1,j\neq i}^{m} A_{ii}\left(A_{ij}x_j(t) + B_{ij}u_j^a(0|t)\right) \\
&\quad + B_{ii}u_i^p(1|t) + \sum_{j=1,j\neq i}^{m}\left(A_{ij}x_j^a(1|t) + B_{ij}u_j^a(1|t)\right) \\
&\vdots \\
x_i^p(N_p|t) &= A_{ii}^{N_p} x_i(t) + A_{ii}^{N_p-1} B_{ii}u_i^p(0|t) + \sum_{j=1,j\neq i}^{m} A_{ii}^{N_p-1}\left(A_{ij}x_j(t) + B_{ij}u_j^a(0|t)\right) \\
&\quad + A_{ii}^{N_p-2} B_{ii}u_i^p(1|t) + \sum_{j=1,j\neq i}^{m} A_{ii}^{N_p-2}\left(A_{ij}x_j^a(1|t) + B_{ij}u_j^a(1|t)\right) \\
&\vdots \\
&\quad + A_{ii}^{N_p-N_c} B_{ii}u_i^p(N_c-1|t) + \sum_{j=1,j\neq i}^{m} A_{ii}^{N_p-N_c}\left(A_{ij}x_j^a(N_c-1|t) + B_{ij}u_j^a(N_c-1|t)\right) \\
&\quad + \sum_{j=1,j\neq i}^{m} A_{ii}^{N_p-N_c-1} A_{ij}x_j^a(N_c|t) + \cdots + \sum_{j=1,j\neq i}^{m} A_{ii}A_{ij}x_j^a(N_p-2|t) + \sum_{j=1,j\neq i}^{m} A_{ij}x_j^a(N_p-1|t)
\end{aligned} \quad (40)$$

The above recursion is expressed in the following augmented matrix:

$$X_i = F_{ii}x_i(t) + G_{ii}U_i + \sum_{j=1,j\neq i}^{m}(F_{ij}X_j + G_{ij}U_j) \quad \text{where} \quad (41)$$

$$X_i = \begin{bmatrix} x_i^p(1|t) \\ x_i^p(2|t) \\ x_i^p(3|t) \\ \vdots \\ x_i^p(N_p|t) \end{bmatrix}, \quad (42)$$

$$U_i = \begin{bmatrix} u_i^p(0|t) \\ u_i^p(1|t) \\ u_i^p(2|t) \\ \vdots \\ u_i^p(N_c-1|t) \end{bmatrix},$$

$$X_j = \begin{bmatrix} x_j(t) \\ x_j^a(1|t) \\ x_j^a(2|t) \\ \vdots \\ x_j^a(N_p-1|t) \end{bmatrix},$$

$$U_j = \begin{bmatrix} u_j^a(0|t) \\ u_j^a(1|t) \\ u_j^a(2|t) \\ \vdots \\ u_j^a(N_c-1|t) \end{bmatrix}$$

$$F_{ii} = \begin{bmatrix} \tilde{A}_{ii} \\ \tilde{A}_{ii}^2 \\ \tilde{A}_{ii}^3 \\ \vdots \\ \tilde{A}_{ii}^{N_p} \end{bmatrix}, G_{ii} = \begin{bmatrix} \tilde{B}_{ii} & 0 & 0 & \cdots & 0 \\ \tilde{A}_{ii}\tilde{B}_{ii} & \tilde{B}_{ii} & 0 & \cdots & 0 \\ \tilde{A}_{ii}^2\tilde{B}_{ii} & \tilde{A}_{ii}\tilde{B}_{ti} & \tilde{B}_{ii} & \cdots & 0 \\ \vdots & \vdots & \vdots & \ddots & \vdots \\ \tilde{A}_{ii}^{N_p-1}\tilde{B}_{ii} & \tilde{A}_{ii}^{N_p-2}\tilde{B}_{ii} & \tilde{A}_{ii}^{N_p-3}\tilde{B}_{ii} & \cdots & \tilde{A}_{ii}^{N_p-N_c}\tilde{B}_{ii} \end{bmatrix} \quad (43)$$

$$F_{ij} = \begin{bmatrix} \tilde{A}_{ij} & 0 & 0 & \cdots & 0 \\ \tilde{A}_{ii}\tilde{A}_{ij} & \tilde{A}_{ij} & 0 & \cdots & 0 \\ \tilde{A}_{ii}\tilde{A}_{ij} & \tilde{A}_{ii}\tilde{A}_{ij} & \tilde{A}_{ij} & \cdots & 0 \\ \vdots & \vdots & \vdots & \ddots & \vdots \\ \tilde{A}_{ii}^{N_p-1}\tilde{A}_{ij} & \tilde{A}_{ii}^{N_p-2}\tilde{A}_{ij} & \tilde{A}_{ii}^{N_p-3}\tilde{A}_{ij} & \cdots & \tilde{A}_{ij} \end{bmatrix}, \quad (44)$$

$$G_{ij} = \begin{bmatrix} \tilde{B}_{ij} & 0 & 0 & \cdots & 0 \\ \tilde{A}_{ii}\tilde{B}_{ij} & \tilde{B}_{ij} & 0 & \cdots & 0 \\ \tilde{A}_{ii}\tilde{B}_{ij} & \tilde{A}_{ii}\tilde{B}_{ij} & \tilde{B}_{ij} & \cdots & 0 \\ \vdots & \vdots & \vdots & \ddots & \vdots \\ \tilde{A}_{ii}^{N_p-1}\tilde{B}_{ij} & \tilde{A}_{ii}^{N_p-2}\tilde{B}_{ij} & \tilde{A}_{ii}^{N_p-3}\tilde{B}_{ij} & \cdots & \tilde{A}_{ii}^{N_p-N_c}\tilde{B}_i \end{bmatrix}$$

S6: The local optimization problem is solved. Without considering the global performance indexes, that is, in the case of non-cooperative distribution, the local optimization problem for the agent i can be designed as follows:

$$\min_{U_i(t)} J_{(i)}(x_i^p, u_i^p, x_j^a, u_j^a) \quad (45)$$

$$= \sum_{k=1}^{N_p} \|x_i(k|t) - w_i(t+k)\|_{Q_i}^2 + \sum_{k=1}^{N_c} \|u_i(k-1|t)\|_{R_i}^2$$

$$= \|X_i - W_i\|_{\tilde{Q}_i}^2 + \|U_i\|_{\tilde{R}_i}^2$$

$J_{(i)}(x_i^p, u_i^p, x_j^a, u_j^a)$ represents a cost function that only considers local control performance. The equation is subject to the following constraints:

$$x_i^p(k+1|t) = \tilde{A}_{ii} x_i^p(k|t) + \tilde{B}_{ii} x_i^p(k|t) + \sum_{j=1, j\neq i}^{m} (\tilde{A}_{ij} x_j^a(k|t) + \tilde{B}_{ij} u_j^a(k|t)) \quad (46)$$

$$x_i^p(0|t) = x_i(t) \quad (47)$$

$$x_j^p(0|t) = x_j(t) \quad (48)$$

$$u_i^p(k|t) \in U_{ij} \quad (49)$$

where $U_{ii}$ is a set of constraints for control input, $w_i(t+k)$ is a reference state value of the agent i, and $W_i$ is a reference state sequence composed of $w_i(t+k)$. $Q_i$ and $R_i$ are a state weight coefficient and a control weight coefficient respectively, and $\tilde{Q}_i = \mathrm{diag}(Q_i, Q_i, \ldots, Q_i)_{N_p \times N_p}$, $\tilde{R}_i = \mathrm{diag}(R_i, R_i, \ldots, R_i)_{N_c \times N_c}$. Specifically, $Q_i$ is penalty for the deviation between an actual trajectory and an expected trajectory, reflecting desire of the vehicle to adhere to the expected trajectory; $R_i$ is penalty for control input, reflecting desire of the vehicle to travel with lower control energy. The constraint (46) is a dynamic constraint for the vehicle. The constraints (47) and (48) require the initial state of the vehicle in the prediction time domain to be equal to the actual state of the vehicle. The constraint (49) is an input constraint for the agent, preventing the optimization result from exceeding the range of the actuator motion.

The difference between the Co-DMPC algorithm and the non-cooperative DMPC algorithm mainly lies in whether the global performance indexes are considered. Each agent has strong dependence on the states or control inputs of its neighbor agents, so that the Co-DMPC requires strong communication capabilities. In addition, cost coupling exists between an agent and its neighbor agents applying the Co-DMPC algorithm when describing the optimization problem. Therefore, the optimization problem considering the global performance indexes can be expressed as:

$$\min_{U_i(t)} J_i(x_i^p, u_i^p, x_j^a, u_j^a) \quad (50)$$

-continued $$= \lambda_i J_{(i)}(x_i^p, u_i^p, x_j^a, u_j^a) + \sum_{j=1, j\neq i}^{m} \lambda_j J_{(j)}(x_j^p, u_j^p, x_i^a, u_i^a)$$

$$= \lambda_i \|X_i - W_i\|_{\tilde{Q}_i}^2 + \lambda_i \|U_i\|_{\tilde{R}_i}^2 + \sum_{j=1, j\neq i}^{m} \left[ \lambda_j \|X_j - W_j\|_{\tilde{Q}_j}^2 + \lambda_j \|U_j\|_{\tilde{R}_j}^2 \right]$$

where $J_i(x_i^p, u_i^p, x_j^a, u_j^a)$ represents a cost function considering global performance, $\lambda_i$ and $\lambda_j$ are coupling coefficients of cost functions between different agents, and $$\sum_{i=1}^{m} \lambda_i = 1.$$

The constraints are the same as those in the formulas (46) to (49). In addition, in order to improve the computing efficiency of the controller, the optimization problem is transformed into a quadratic programming problem:

$$J_i(x_i^p, u_i^p x_j^a, u_j^a) \quad (51)$$

$$= \lambda_i \left\| F_{ii} x_i(k) + G_{ii} U_i + \sum_{j=1, j\neq i}^{m} (F_{ij} X_j + G_{ij} U_j) - W_i \right\|_{Q_i}^2 + \lambda_i \|U_i\|_{R_i}^2$$

$$+ \sum_{j=1, j\neq i}^{m} \lambda_j \left\| F_{jj} x_j(k) + G_{jj} U_j + \sum_{k=1, k\neq j}^{m} (F_{jk} X_k + G_{jk} U_k) - W_j \right\|_{Q_j}^2 + \sum_{j=1, j\neq i}^{m} \lambda_j \|U_j\|_{R_j}^2$$

$$= U_i^T \mathfrak{J}_i U_i + 2(\mathsf{R}_i + \aleph_i) U_i + \mathrm{const}$$

where const is a constant term not affecting the optimization result, and $$\mathfrak{J}_i = \lambda_i G_{ii}^T Q_i G_{ii} + \lambda_i R_i + \sum_{j=1, j\neq i}^{m} \lambda_j G_{ji}^T Q_i G_{ji} \quad (52)$$

$$\mathsf{R}_i = \sum_{j=1}^{m} \lambda_j [x_j^T(k) F_{jj}^T - W_j^T] Q_j G_{ji}$$

$$\aleph_i = \sum_{j=1}^{m} \lambda_j \left[ \sum_{k}^{m} U_k^T G_{jk}^T + \sum_{k=1, k\neq j}^{m} X_k^T F_{jk}^T \right] Q_j G_{ji}$$

After completing a single optimization computation, the local agent only obtains a local optimal solution and cannot achieve accurate control of the vehicle. In order to reduce the optimization error, the present disclosure adopts a cyclic iterative update method to exchange multiple times an optimal control sequence and an optimal state sequence after optimization within a single control cycle, thereby achieving a global optimal solution. At the same time, it should be noted that the use of the iterative update method actually increases the computational burden of the controller and the occupancy rate of the communication network. Therefore, setting the iteration termination conditions reasonably is an important factor to ensure the real-time performance of the controller.

The present disclosure designs two termination conditions in response to the above requirements. Firstly, the error between two consecutive iterative optimization results is recorded as $\text{Err}_i=|U_i^n-U_i^{n-1}|$. $U_i^n$ represents the optimization result of the agent i in the $n^{th}$ iteration. When the iteration error $\text{Err}_i$ is less than a threshold $\varepsilon_i$ (i=1 indicates the iteration error of the steering agent and i=2 indicates the iteration error of the DYC agent), the controller optimization result converges to a global optimal solution. At this time, the iteration is terminated and the next step is carried out. If the controller iteration error fails to converge to $\varepsilon_i$, a maximum number of iterations $p_{max}$ needs to be set to prevent the controller from performing invalid computation.

S7: The direct yaw moment is distributed. After computing the direct yaw moment of the vehicle, the DYC agent needs to distribute it reasonably to the four wheels according to the state of the vehicle, thereby avoiding tire force saturation. The distributed torques must also meet the requirements of driving the vehicle forward and tracking the target speed.

Firstly, a total driving force equation of the vehicle is established according to a PID algorithm:

$$F_x(t) = K_p e(t) + K_i \int_0^t e(\tau)d\tau + K_d \frac{de(t)}{dt} \quad (53)$$

where $K_p$ represents a proportional coefficient, $K_i$ represents an integral coefficient, and $K_d$ represents a derivative coefficient, $e(t)=v_x-v_{xref}$.

Next, the following optimization problem is considered:

$$\min_{F_{xij},i=fl,fr,rl,rr} J = \frac{F_{xfl}^2+F_{yfl}^2}{(\mu F_{xfl})^2} + \frac{F_{xfr}^2+F_{yfr}^2}{(\mu F_{zfr})^2} + \frac{F_{xrl}^2+F_{xrr}^2}{(\mu F_{zrl})^2} + \frac{F_{xrr}^2+F_{yrr}^2}{(\mu F_{zrr})^2} \quad (54)$$

where J is an abbreviation of a tire force distribution optimization problem; $F_{xij}$ represents longitudinal forces of a left front wheel, a right front wheel, a left rear wheel, and a right rear wheel; $F_{zij}$ represents vertical forces of the left front wheel, the right front wheel, the left rear wheel, and the right rear wheel; $F_{yij}$ represents lateral forces of four tires; ij=fl, fr, rl, rr represents the left front wheel, the right front wheel, the left rear wheel, and the right rear wheel respectively; and $\mu$ is an adhesion coefficient. Since the steering agent has computed the steering angles of the four wheels, the lateral tire force $F_{yij}$ is a constant and has no effect on solution of the above optimization problem. Therefore, the formula (54) can be expressed as:

$$\min_{F_{xij},i=fl,fr,rl,rr} J = \frac{F_{xfl}^2}{(\mu F_{zfl})^2} + \frac{F_{xfr}^2}{(\mu F_{zfr})^2} + \frac{F_{xfl}^2}{(\mu F_{zrl})^2} + \frac{F_{xrr}^2}{(\mu F_{zrr})^2} \quad (55)$$

The above formula is subject to the following constraints:

$$\frac{F_{xfl}}{m_s} + \frac{F_{xfr}}{m_s} + \frac{F_{xrl}}{m_s} + \frac{F_{xrr}}{m_s} = F_x \quad (56)$$

$$\frac{d}{2}(F_{xfr}+F_{xrr}) - \frac{d}{2}(F_{xfl}+F_{xrl}) = M_z \quad (57)$$

$$\frac{T_{min}}{R_w} \le F_{xi} \le \frac{T_{max}}{R_w}, i = fl, fr, rl, rr \quad (58)$$

where $R_w$ represents a wheel radius, d represents a track width, $F_x$ represents a total longitudinal force, the constraint (56) requires the total driving force distributed to the four wheels to meet the requirements of the speed controller, the constraint (57) requires the yaw moment formed by the longitudinal tire force to satisfy the computation result of the DYC agent, and the constraint (58) requires the magnitude of the driving force to be within the range of the actuator motion; $T_{min}$ is a minimum driving torque (that is, braking torque), $T_{max}$ is a maximum driving torque, and $T_{max}=-T_{min}$. The fmincon command is used in MATLAB to solve the formula (55) to obtain the driving/braking torques of the four wheels.

S8: The computation results of the steering agent and the DYC agent are sent to the actuator.

Based on the above control method, in the embodiments of the present disclosure:

An autonomous vehicle controller configured to execute the control method is provided.

A storage medium configured to store program codes of the control method is provided.

The above descriptions are merely practical embodiments of the present disclosure, and are not intended to limit the protection scope of the present disclosure. Any equivalent implementations or modifications made without departing from the technologies of the present disclosure shall fall within the protection scope of the present disclosure.

The invention claimed is:

1. A cooperative distributed model predictive control (Co-DMPC)-based chassis multi-agent system (MAS) cooperative control method for autonomous vehicles, comprising: S1: building a two-degree-of-freedom vehicle model with four-wheel steering and direct yaw moment control (DYC); S2: establishing a distributed state-space equation, wherein a centralized state-space equation of a vehicle is divided into two agents, namely, a steering agent and a DYC agent according to different control variables; as for the steering agent, the distributed state-space equation has control variables of a front wheel steering angle $\delta_f$ and a rear wheel steering angle $\delta_r$ and state variables of a lateral velocity $v_y$ and a vehicle lateral displacement Y; as for the DYC agent, the distributed state-space equation has a control variable of a direct yaw moment $M_z$ and tracked state variables of a yaw rate $\gamma$ and a yaw angle $\varphi$ S3: building a cooperative control framework, comprising: an input layer, wherein the two-degree-of-freedom vehicle model computes a reference yaw rate $\gamma_{ref}$ and a reference lateral velocity $v_{ref}$ according to deviation between a current state of the vehicle and a target path; a cooperative control layer, wherein a centralized chassis control system is decomposed into a distributed control system consisting of a plurality of controllers, to achieve tracking of expected targets; through the distributed state-space equation established in the S2, a Co-DMPC algorithm is employed to select a cost function considering global performance; an iterative update method is used in a unit sampling time, enabling agents to independently compute local optimization and exchange computation results multiple times, and an entire chassis multi-agent system obtains a global optimal solution; a moment distribution layer, wherein driving/braking torques of four wheels are optimally distributed based on a total driving force computed by a proportional-integral-derivative (PID) speed controller and a direct yaw moment computed by the cooperative control layer as constraints; and an actuation layer, wherein the control variables are applied to the four wheels through a steering actuator and a hub motor to achieve accurate control of the vehicle; S4: establishing an information transmission protocol, wherein a same prediction time domain $N_p$ and a same control time domain $N_c$ are used in all the agents; as for an agent i, in a control time domain [t, t+$N_c$], a control variable at a time point t+k is predicted at a time point t as $u_i(k|t)$, and following three sets of control trajectories are defined: $u_i^p(k|t)$: predicted control trajectory; $u_i^*(k|t)$: optimal control trajectory; $u_i^a(k|t)$: assumed control trajectory; wherein $u_i^p(k|t)$ represents a control variable at a future time point predicted based on the current state and a control variable at a previous time point; $u_i^*(k|t)$ represents an optimal solution obtained after solving local optimization problems; $u_i^a(k|t)$ represents an assumed control variable transmitted by the agent i to a neighbor agent and is obtained by shifting a predicted control variable by one sampling period; in a prediction time domain [t, t+$N_p$], a state variable at the time point t+k is predicted at the time point t as $x_i(k|t)$, and following three sets of state trajectories are defined: $x_i^p(k|t)$: predicted state trajectory; $x_i^*(k|t)$: optimal state trajectory; $x_i^a(k|t)$: assumed state trajectory; the agent i uses, at the time point t, a predicted state at the future time point and an assumed state $x_j^p(k|t)$ and an assumed control $u_j^a(k|t)$ from the neighbor agent to solve a distributed optimization problem; when k=0, $x_i^p(0|t)=x_i(t)$ and $x_j^p(0|t)=x_j(t)$, wherein $x_i(t)$ and $x_j(t)$ are directly measured current states of the vehicle; after obtaining an optimal state $x_i^*(k|t)$ and an optimal control $u_i^*(k|t)$, a first $u_i^*(0|t)$ of a control trajectory is applied to actual control; a single-step recursion is performed on the optimal state trajectory and the optimal control trajectory to obtain assumed trajectories as follows: $u_i^a(k-1|t+1)=u_i^*(k|t)$, $k \in [1, N_c-1]$ $$x_i^a(k-1|t+1)=x_i^*(k|t), k \in [1, N_p] \quad (1)$$

wherein a length of the control tr to complete a last term, $u_i^a(N_c-1|t+1)=0$; and a state of the vehicle not under control at a next time point is $x_i^a(N_p|t+1)=Ax_i^a(N_p-1|t+1)=Ax_i^*(N_p|t)$; and S5: controlling the four wheels through the steering actuator and the hub motor using the control variables.

2. The Co-DMPC-based chassis MAS cooperative control method for the autonomous vehicles according to claim 1, wherein the two-degree-of-freedom vehicle model in the S1 is:

$$\begin{cases} \dot{v}_y = -v_x\gamma - \dfrac{C_{af}}{m_s}\left(\dfrac{v_y+l_f\gamma}{v_x}-\delta_f\right) - \dfrac{C_{ar}}{m_s}\left(\dfrac{v_y+l_r\gamma}{v_x}-\delta_r\right) \\ \dot{\gamma} = \dfrac{l_f C_{af}}{I_z}\left(\dfrac{v_y+l_f\gamma}{v_x}-\delta_f\right) + \dfrac{l_r C_{ar}}{I_z}\left(\dfrac{v_y-l_r\gamma}{v_x}-\delta_r\right) + \dfrac{M_z}{I_z} \end{cases} \quad (2)$$

wherein $v_x$ is a longitudinal velocity, $v_y$ is a lateral velocity, $\gamma$ is a yaw rate, $m_s$ is vehicle mass, $C_{af}$ and $C_{ar}$ are front and rear wheel cornering stiffnesses respectively, $l_f$ and $l_r$ are distances from front and rear wheel centers to a center of mass respectively, $\delta_f$ and $\delta_r$ are front and rear wheel steering angles respectively, $I_z$ is a moment of inertia of the vehicle rotating around a z axis, and $M_z$ is a direct yaw moment; and the two-degree-of-freedom vehicle model is combined with path tracking to obtain following dynamic equations:

$$\begin{cases} \dot{v}_y = \dfrac{C_{af}+C_{ar}}{m_s v_x}v_y + \left(\dfrac{C_{ar}l_r - C_{af}l_f}{m_s v_x} - v_x\right)\gamma + \dfrac{C_{af}}{m_s}\delta_f + \dfrac{C_{ar}}{m_s}\delta_r \\ \dot{\gamma} = \dfrac{C_{ar}l_r - C_{af}l_f}{I_z v_x}v_y - \dfrac{C_{af}l_f^2 + C_{ar}l_r^2}{I_z v_x}\gamma + \dfrac{l_f C_{af}}{I_z}\delta_f - \dfrac{l_r C_{ar}}{I_z}\delta_r + \dfrac{M_z}{I_z} \\ \dot{Y} = v_y\cos\varphi + (v_x\cos\varphi - v_y\sin\varphi)\varphi \\ \dot{\varphi} = \gamma \end{cases} \quad (3)$$

wherein Y is a lateral displacement of the vehicle and $\varphi$ is a yaw angle.

3. The Co-DMPC-based chassis MAS cooperative control method for the autonomous vehicles according to claim 2, wherein the distributed state-space equation of the steering agent in the S2 is:

$$\dot{x}_1(t) = A_{11}x_1(t) + B_{11}u_1(t) + A_{12}x_2(t) + B_{12}u_2(t) \quad (4)$$

wherein $$x_1 = \begin{bmatrix} v_y \\ Y \end{bmatrix}, A_{11} = \begin{bmatrix} -\dfrac{C_{af}+C_{ar}}{m_s v_x} & 0 \\ \cos\varphi & 0 \end{bmatrix}, u_1 = \begin{bmatrix} \delta_f \\ \delta_r \end{bmatrix}, B_{11} = \begin{bmatrix} \dfrac{C_{af}}{m_s} & \dfrac{C_{ar}}{m_s} \\ 0 & 0 \end{bmatrix}$$

$$x_2 = \begin{bmatrix} \gamma \\ \varphi \end{bmatrix}, A_{12} = \begin{bmatrix} \dfrac{C_{ar}l_r - C_{af}l_f}{m_s v_x} - v_x & 0 \\ 0 & v_x\cos\varphi - v_y\sin\varphi \end{bmatrix}, u_2 = M_z, B_{12} = \begin{bmatrix} 0 \\ 0 \end{bmatrix} \quad (5)$$

4. The Co-DMPC-based chassis MAS cooperative control method for the autonomous vehicles according to claim 3, wherein the distributed state-space equation of the DYC agent in the S2 is:

$$\dot{x}_2(t) = A_{22}x_2(t) + B_{22}u_2(t) + A_{21}x_1(t) + B_{21}u_1(t) \quad (6)$$

wherein $$A_{22} = \begin{bmatrix} \dfrac{C_{af}l_f^2 + C_{ar}l_r^2}{I_z v_x} & 0 \\ 1 & 0 \end{bmatrix}, B_{22} = \begin{bmatrix} \dfrac{1}{I_z} \\ 0 \end{bmatrix},$$

$$A_{21} = \begin{bmatrix} \dfrac{C_{ar}l_r - C_{af}l_f}{I_z v_x} & 0 \\ 0 & 0 \end{bmatrix}, B_{21} = \begin{bmatrix} \dfrac{l_f C_{af}}{I_z} & -\dfrac{l_r C_{ar}}{I_z} \\ 0 & 0 \end{bmatrix} \quad (7)$$

5. The Co-DMPC-based chassis MAS cooperative control method for the autonomous vehicles according to claim 4, wherein the Co-DMPC algorithm in the cooperative control layer comprises:

S6: establishing a local agent state equation, comprising:
S6.1 establishing a multi-agent local continuous linear state equation:

$$\dot{x}_i(t) = A_{ii}x_i(t) + B_{ii}u_i(t) + \sum_{j=1, j \neq i}^{m}(A_{ij}x_j(t) + B_{ij}u_j(t)) \quad (8)$$

wherein m is a number of the agents;
S6.2 discretizing the above formula into:

$$x_i(k+1|t) = \tilde{A}_{ii}x_i(k|t) + \tilde{B}_{ii}u_i(k|t) + \sum_{j=1, j \neq i}^{m}(\tilde{A}_{ij}x_j(k|t) + \tilde{B}_{ij}u_j(k|t)) \quad (9)$$

wherein $$\tilde{A}_{ii}=I+TA_{ii}, \tilde{B}_{ii}=TB_{ii}, \tilde{A}_{ij}=TA_{ij}, \tilde{B}_{ij}=TB_{ij} \quad (10)$$

T represents the sampling period;

S6.3 obtaining by recursion $x_i^p$ in a time domain $[1, N_p]$:

$$x_i^p(1|t) = A_{ii}x_i(t) + B_{ii}u_i^p(0|t) + \sum_{j=1,j\neq i}^{m}\left(A_{ij}x_j(t) + B_{ij}u_j^a(0|t)\right)$$

$$x_i^p(2|t) = A_{ii}x_i^p(1|t) + B_{ii}u_i^p(1|t) + \sum_{j=1,j\neq i}^{m}\left(A_{ij}x_j^a(1|t) + B_{ij}u_j^a(1|t)\right)$$

$$= A_{ii}^2 x_i(t) + A_{ii}B_{ii}u_i^p(0|t) + \sum_{j=1,j\neq i}^{m} A_{ii}\left(A_{ij}x_j(t) + B_{ij}u_j^a(0|t)\right)$$

$$+ B_{ii}u_i^p(1|t) + \sum_{j=1,j\neq i}^{m}\left(A_{ij}x_j^a(1|t) + B_{ij}u_j^a(1|t)\right)$$

$$\vdots$$

$$x_i^p(N_p|t) = A_{ii}^{N_p} x_i(t) + A_{ii}^{N_p-1}B_{ii}u_i^p(0|t) + \sum_{j=1,j\neq i}^{m} A_{ii}^{N_p-1}\left(A_{ij}x_j(t) + B_{ij}u_j^a(0|t)\right)$$

$$+ A_{ii}^{N_p-2}B_{ii}u_i^p(1|t) + \sum_{j=1,j\neq i}^{m} A_{ii}^{N_p-2}\left(A_{ij}x_j^a(1|t) + B_{ij}u_j^a(1|t)\right)$$

$$\vdots$$

$$+ A_{ii}^{N_p-N_c}B_{ii}u_i^p(N_c-1|t) + \sum_{j=1,j\neq i}^{m} A_{ii}^{N_p-N_c}\left(A_{ij}x_j^a(N_c-1|t) + B_{ij}u_j^a(N_c-1|t)\right)$$

$$+ \sum_{j=1,j\neq i}^{m} A_{ii}^{N_p-N_c-1} A_{ij}x_j^a(N_c|t) + \ldots + \sum_{j=1,j\neq i}^{m} A_{ii}A_{ij}x_j^a(N_p-2|t) + \sum_{j=1,j\neq i}^{m} A_{ij}x_j^a(N_p-1|t)$$

(11)

and

S6.4 expressing the recursion in a following augmented matrix:

$$X_i = F_{ii}x_i(t) + G_{ii}U_i + \sum_{j=1,j\neq i}^{m}(F_{ij}X_j + G_{ij}U_j) \quad (12)$$

wherein $$X_i = \begin{bmatrix} x_i^p(1|t) \\ x_i^p(2|t) \\ x_i^p(3|t) \\ \vdots \\ x_i^p(N_p|t) \end{bmatrix}, U_i = \begin{bmatrix} u_i^p(0|t) \\ u_i^p(1|t) \\ u_i^p(2|t) \\ \vdots \\ u_i^p(N_c-1|t) \end{bmatrix}, \quad (13)$$

$$X_j = \begin{bmatrix} x_j(t) \\ x_j^a(1|t) \\ x_j^a(2|t) \\ \vdots \\ x_j^a(N_p-1|t) \end{bmatrix}, U_j = \begin{bmatrix} u_j^a(0|t) \\ u_j^a(1|t) \\ u_j^a(2|t) \\ \vdots \\ u_j^a(N_c-1|t) \end{bmatrix},$$

$$F_{ii} = \begin{bmatrix} \tilde{A}_{ii} \\ \tilde{A}_{ii}^2 \\ \tilde{A}_{ii}^3 \\ \vdots \\ \tilde{A}_{ii}^{N_p} \end{bmatrix}, G_{ii} = \begin{bmatrix} \tilde{B}_{ii} & 0 & 0 & \ldots & 0 \\ \tilde{A}_{ii}\tilde{B}_{ii} & \tilde{B}_{ii} & 0 & \ldots & 0 \\ \tilde{A}_{ii}^2\tilde{B}_{ii} & \tilde{A}_{ii}\tilde{B}_{ii} & \tilde{B}_{ii} & \ldots & 0 \\ \vdots & \vdots & \vdots & \ddots & \vdots \\ \tilde{A}_{ii}^{N_p-1}\tilde{B}_{ii} & \tilde{A}_{ii}^{N_p-2}\tilde{B}_{ii} & \tilde{A}_{ii}^{N_p-3}\tilde{B}_{ii} & \ldots & \tilde{A}_{ii}^{N_p-N_c}\tilde{B}_{ii} \end{bmatrix} \quad (14)$$

$$F_{ij} = \begin{bmatrix} \tilde{A}_{ij} & 0 & 0 & \ldots & 0 \\ \tilde{A}_{ii}\tilde{A}_{ij} & \tilde{A}_{ij} & 0 & \ldots & 0 \\ \tilde{A}_{ii}^2\tilde{A}_{ij} & \tilde{A}_{ii}\tilde{A}_{ij} & \tilde{A}_{ij} & \ldots & 0 \\ \vdots & \vdots & \vdots & \ddots & \vdots \\ \tilde{A}_{ii}^{N_p-1}\tilde{A}_{ij} & \tilde{A}_{ii}^{N_p-2}\tilde{A}_{ij} & \tilde{A}_{ii}^{N_p-3}\tilde{A}_{ij} & \ldots & \tilde{A}_{ij} \end{bmatrix}, \quad (15)$$

$$G_{ij} = \begin{bmatrix} \tilde{B}_{ij} & 0 & 0 & \ldots & 0 \\ \tilde{A}_{ii}\tilde{B}_{ij} & \tilde{B}_{ij} & 0 & \ldots & 0 \\ \tilde{A}_{ii}^2\tilde{B}_{ij} & \tilde{A}_{ii}\tilde{B}_{ij} & \tilde{B}_{ij} & \ldots & 0 \\ \vdots & \vdots & \vdots & \ddots & \vdots \\ \tilde{A}_{ii}^{N_p-1}\tilde{B}_{ij} & \tilde{A}_{ii}^{N_p-2}\tilde{B}_{ij} & \tilde{A}_{ii}^{N_p-3}\tilde{B}_{ij} & \ldots & \tilde{A}_{ii}^{N_p-N_c}\tilde{B}_{ij} \end{bmatrix}.$$

6. The Co-DMPC-based chassis MAS cooperative control method for the autonomous vehicles according to claim 5, wherein, in the cooperative control layer, the Co-DMPC algorithm further comprises:

S7: solving the local optimization, comprising:

S7.1 expressing the local optimization problem considering global performance indexes as:

$$\min_{U_i(t)} J_i(x_i^p, u_i^p, x_j^a, u_j^a) \quad (16)$$

$$= \lambda_i J_{(i)}(x_i^p, u_i^p, x_j^a, u_j^a) + \sum_{j=1,j\neq i}^{m} \lambda_j J_{(j)}(x_j^p, u_j^p, x_i^a, u_i^a)$$

-continued $$= \lambda_i \|X_i - W_q\|_{\tilde{Q}_i}^2 + \lambda_i \|U_i\|_{\tilde{R}_i}^2 + \sum_{j=1, j \neq i}^{m} \left[ \lambda_j \|X_j - W_j\|_{\tilde{Q}_j}^2 + \lambda_j \|U_j\|_{\tilde{R}_j}^2 \right]$$

wherein the equation (16) is subject to following constraints:

$$x_i^p(k+1|t) = \tilde{A}_{ii} x_i^p(k|t) + \tilde{B}_{ii} x_i^p(k|t) + \sum_{j=1, j \neq i}^{m} \left( \tilde{A}_{ij} x_j^a(k|t) + \tilde{B}_{ij} u_j^a(k|t) \right) \quad (17)$$

$$x_i^p(0|t) = x_i(t) \quad (18)$$

$$x_j^p(0|t) = x_j(t) \quad (19)$$

$$u_i^p(k|t) \in U_{ij} \quad (20)$$

$U_{ii}$ is a set of constraints for control input; $\lambda_i$ and $\lambda_j$ are coupling coefficients of cost functions between different agents, and $$\sum_{i=1}^{m} \lambda_i = 1; w_i(t+k)$$

is a reference state value of the agent i, and $W_i$ is a reference state sequence composed of $w_i(t+k)$; $Q_i$ and $R_i$ are a state weight coefficient and a control weight coefficient respectively, and $\tilde{Q}_i = \text{diag}(Q_i, Q_i, \ldots, Q_i)_{N_p \times N_p}$, $\tilde{R}_i = \text{diag}(R_i, R_i, \ldots, R_i)_{N_c \times N_c}$ wherein $Q_i$ is penalty for deviation between an actual trajectory and an expected trajectory, reflecting desire of the vehicle to adhere to the expected trajectory; $R_i$ is penalty for the control input, reflecting desire of the vehicle to travel with lower control energy; the constraint (17) is a dynamic constraint for the vehicle, the constraints (18) and (19) require an initial state of the vehicle in the prediction time domain to be equal to an actual state of the vehicle, and the constraint (20) is an input constraint for the agents, preventing an optimization result from exceeding a range of actuator motion;

S7.2 transforming an optimization problem into a quadratic programming problem to improve computing efficiency:

$$J_i(x_i^p, u_i^p, x_j^a, u_j^a) = \quad (21)$$

$$\lambda_i \left\| F_{ii} x_i(k) + G_{ii} U_i + \sum_{j=1, j \neq i}^{m} (F_{ij} X_j + G_{ij} U_j) - W_i \right\|_Q^2 + \lambda_i \|U_i\|_{\tilde{R}_i}^2 +$$

$$\sum_{j=1, j \neq i}^{m} \lambda_j \left\| F_{jj} x_j(k) + G_{jj} U_j + \sum_{k=1, k \neq j}^{m} (F_{jk} X_k + G_{jk} U_k) - W_j \right\|_{Q_j}^2 +$$

$$\sum_{j=1, j \neq i}^{m} \lambda_j \|U_j\|_{\tilde{R}_j}^2 = U_i^T J_i U_i + 2(R_i + \aleph_i) U_i + \text{const}$$

wherein const is a constant term not affecting the optimization result, and $$\mathfrak{J}_i = \lambda_i G_{ii}^T Q_i G_{ii} + \lambda_i R_i + \sum_{j=1, j \neq i}^{m} \lambda_j G_{ji}^T Q_j G_{ji} \quad (22)$$

$$\mathsf{R}_i = \sum_{j=1}^{m} \lambda_j [x_j^T(k) F_{jj}^T - W_j^T] Q_j G_{ji} \quad ;$$

$$\aleph_i = \sum_{j=1}^{m} \lambda_j \left[ \sum_{k=1, k \neq i}^{m} U_k^T G_{jk}^T + \sum_{k=1, k \neq j}^{m} X_k^T F_{jk}^T \right] Q_j G_{ji}$$

and

S7.3 obtaining a local optimal solution by a local agent after completing a single optimization computation.

7. The Co-DMPC-based chassis MAS cooperative control method for the autonomous vehicles according to claim 6, wherein, in the cooperative control layer, the Co-DMPC algorithm further comprises:

adopting a cyclic iterative update method to enable the agents to exchange multiple times an optimal control sequence and an optimal state sequence after the local optimization within the unit sampling time and achieve the global optimal solution, wherein two termination conditions are designed for iterative update as follows:

recording an error between two consecutive iterative optimization results as $\text{Err}_i = |U_i^n - U_i^{n-1}|$, wherein $U_i^n$ represents the optimization result of the agent i in an $n^{th}$ iteration; when the error $\text{Err}_i$ is less than a threshold $\varepsilon_i$, i=1 indicates an iteration error of the steering agent, and i=2 indicates an iteration error of the DYC agent, the controller optimization result converges to the global optimal solution and iteration is terminated; and if the iteration error fails to converge to $\varepsilon_i$, a maximum number of the iteration $p_{max}$ is set and when a number of the iteration is greater than $p_{max}$, computation is terminated.

8. The Co-DMPC-based chassis MAS cooperative control method for the autonomous vehicles according to claim 7, wherein implementation of the moment distribution layer comprises:

establishing a total driving force equation of the vehicle according to a PID algorithm:

$$F_x(t) = K_p e(t) + K_i \int_0^t e(\tau) d\tau + K_d \frac{de(t)}{dt} \quad (23)$$

wherein $K_p$ represents a proportional coefficient, $K_i$ represents an integral coefficient, $K_d$ represents a derivative coefficient, and $e(t) = v_x - v_{xref}$;

considering a following optimization problem:

$$\min_{F_{xij}, i=fl, fr, rl, rr} J = \frac{F_{xfl}^2 + F_{yfl}^2}{(\mu F_{zfl})^2} + \frac{F_{xfr}^2 + F_{yfr}^2}{(\mu F_{zfr})^2} + \frac{F_{xrl}^2 + F_{yrl}^2}{(\mu F_{zrl})^2} + \frac{F_{xrr}^2 + F_{yrr}^2}{(\mu F_{zrr})^2} \quad (24)$$

wherein J is an abbreviation of a tire force distribution optimization problem; $F_{xij}$ represents longitudinal forces of a left front wheel, a right front wheel, a left rear wheel, and a right rear wheel; $F_{zij}$ represents vertical forces of the left front wheel, the right front wheel, the left rear wheel, and the right rear wheel; $F_{yij}$ represents lateral forces of four tires; ij=fl, fr, rl, rr represents the left front wheel, the right front wheel, the left rear wheel, and the right rear wheel respectively; since the steering agent has computed the steering angles of the four wheels, the lateral tire force $F_{yij}$ is a constant and has no effect on solution of the above optimization problem; the formula (24) is simplified into:

$$\min_{F_{xij}, i=fl,fr,rl,rr} J = \frac{F_{xfl}^2}{(\mu F_{zfl})^2} + \frac{F_{xfr}^2}{(\mu F_{zfr})^2} + \frac{F_{xrl}^2}{(\mu F_{zrl})^2} + \frac{F_{xrr}^2}{(\mu F_{zrr})^2}$$

the above formula is subject to following constraints:

$$\frac{F_{xfl}}{m_s} + \frac{F_{xfr}}{m_s} + \frac{F_{xrl}}{m_s} + \frac{F_{xrr}}{m_s} = F_x \quad (26)$$

$$\frac{d}{2}(F_{xfr} + F_{xrr}) - \frac{d}{2}(F_{xfl} + F_{xrl}) = M_z \quad (27)$$

$$\frac{T_{min}}{R_w} \leq F_{xi} \leq \frac{T_{max}}{R_w}, i = fl, fr, rl, rr \quad (28)$$

wherein $R_w$ represents a wheel radius, the constraint (26) requires the total driving force distributed to the four wheels to meet requirements of the PID speed controller, the constraint (27) requires a yaw moment formed by a longitudinal tire force to satisfy a computation result of the DYC agent, and the constraint (28) requires a magnitude of a driving force to be within the range of the actuator motion; $T_{min}$ is a minimum driving torque, that is, braking torque, $T_{max}$ is a maximum driving torque, and $T_{max} = -T_{min}$; the formula (25) is solved to obtain the driving/braking torques of the four wheels.

9. An autonomous vehicle controller, configured to execute the Co-DMPC-based chassis MAS cooperative control method for the autonomous vehicles according to claim 1.

10. A non-transitory storage medium, configured to store program codes of the Co-DMPC-based chassis MAS cooperative control method for the autonomous vehicles according to claim 1.

* * * * *